(12) United States Patent
Childers et al.

(10) Patent No.: US 11,003,849 B2
(45) Date of Patent: May 11, 2021

(54) TECHNOLOGIES FOR VALID DEPENDENCY PARSING IN CASUAL TEXT

(71) Applicant: NarrativeDx, Inc., Austin, TX (US)

(72) Inventors: Zach W. Childers, Austin, TX (US); Kyle Robertson, Austin, TX (US); Taylor Turpen, Pflugerville, TX (US)

(73) Assignee: Press Ganey Associates, LLC, South Bend, IN (US)

( * ) Notice: Subject to any disclaimer, the term of this patent is extended or adjusted under 35 U.S.C. 154(b) by 110 days.

(21) Appl. No.: 16/124,829

(22) Filed: Sep. 7, 2018

(65) Prior Publication Data

US 2019/0073352 A1 Mar. 7, 2019

Related U.S. Application Data

(60) Provisional application No. 62/555,331, filed on Sep. 7, 2017.

(51) Int. Cl.
| | |
|---|---|
| *G06F 40/205* | (2020.01) |
| *G10L 15/183* | (2013.01) |
| *G06F 16/31* | (2019.01) |
| *G06F 40/211* | (2020.01) |
| *G06F 40/253* | (2020.01) |
| *G06F 40/289* | (2020.01) |

(52) U.S. Cl.
CPC .......... *G06F 40/205* (2020.01); *G06F 16/322* (2019.01); *G06F 40/211* (2020.01); *G06F 40/253* (2020.01); *G06F 40/289* (2020.01); *G10L 15/183* (2013.01)

(58) Field of Classification Search
USPC .................................................... 704/1–504
See application file for complete search history.

(56) References Cited

U.S. PATENT DOCUMENTS

| | | | |
|---|---|---|---|
| 9,305,544 B1* | 4/2016 | Petrov | G10L 15/06 |
| 10,679,011 B2* | 6/2020 | Galitsky | G06N 3/006 |
| 10,839,161 B2* | 11/2020 | Galitsky | G06F 40/216 |
| 2008/0221870 A1* | 9/2008 | Attardi | G06F 40/151 |
| | | | 704/9 |
| 2017/0235719 A1* | 8/2017 | Feldman | G06F 40/216 |
| | | | 704/9 |

(Continued)

*Primary Examiner* — Marcus T Riley
(74) *Attorney, Agent, or Firm* — Quarles & Brady LLP

(57) ABSTRACT

Technologies for natural language processing include a computing device that loads natural language text data that includes multiple words, such as a naturally elicited response or comment data. The computing device applies a constituency parser to the natural language text data to generate a constituency parse tree. The constituency parse tree may include multiple nodes that each correspond to a hierarchical constituent of the natural language text. The computing device applies a constituency rule to identify clauses in the natural language text data. The constituency rule may identify a left-most daughter of each subordinate clause node of the constituency parse tree. Each subordinate clause is distinct, preventing dependencies from crossing clause boundaries. The computing device applies a dependency parser to each clause to generate a corresponding dependency parse. Each dependency parse may include a graph with nodes corresponding to words of the clause and edges corresponding to dependency relationships.

20 Claims, 3 Drawing Sheets

(56) References Cited

U.S. PATENT DOCUMENTS

2018/0357220 A1* 12/2018 Galitsky ............... G06F 40/216
2018/0365593 A1* 12/2018 Galitsky ................ G06N 20/20
2019/0073352 A1*  3/2019 Childers ............... G06F 40/205

* cited by examiner

US 11,003,849 B2

TECHNOLOGIES FOR VALID DEPENDENCY PARSING IN CASUAL TEXT

CROSS-REFERENCE TO RELATED APPLICATIONS

The present application claims the benefit of U.S. Provisional Patent Application No. 62/555,331, filed Sep. 7, 2017.

BACKGROUND

Natural language parsing may include dependency parsing according to a dependency grammar. A dependency grammar is based on directed links (dependencies) between words of a natural language text. Typical techniques for dependency parsing may produce invalid dependency parses across clause boundaries, positing invalid semantic dependencies between independent words and phrases. For example, typical dependency parsers may start with "noun chunking," which may result in invalid dependency parses for certain situations in naturally elicited responses. In particular, online and casual text, which often lack correct punctuation and spelling, may result in invalid dependency parses.

SUMMARY

According to one aspect, a computing device for natural language parsing includes input logic, constituency parser logic, clause boundary logic, and dependency parser logic. The input logic is to load natural language text data. The natural language text data includes a plurality of words. The constituency parser logic is to apply a constituency parser to the natural language text data to generate a constituency parse tree. The clause boundary logic is to apply a constituency rule to the constituency parse tree to identify a plurality of clauses in the natural language text data. Each of the clauses includes a disjoint subset of the plurality of words of the natural language text data. The dependency parser logic is to apply a dependency parser to each of the plurality of clauses to generate a dependency parse of each of the plurality of clauses.

In some embodiments, the constituency parse tree may include a plurality of nodes, wherein each node corresponds to a hierarchical constituent of the natural language text data. In some embodiments, to apply the constituency rule may include to identify a left-most daughter of a subordinate clause node of the constituency parse tree. In some embodiments, each dependency parse may include a graph that includes a plurality of nodes and one or more edges, wherein each of the nodes corresponds to a word of the corresponding clause, and wherein each of the edges corresponds to a dependency relationship within the clause.

In some embodiments, the natural language text data may include a naturally elicited response. In some embodiments, the natural language text data may include comment data submitted by a user to a website.

In some embodiments, to apply the constituency parser may include to apply a constituency parser that does not rely on noun chunking as an initial parsing step. In some embodiments, to apply the constituency rule may include to determine a plurality of clause boundaries, wherein each of the clause boundaries is associated with a corresponding clause of the plurality of clauses. In some embodiments, the plurality of clause boundaries may include a plurality of non-overlapping character offsets in the natural language text data, wherein each of the non-overlapping character offsets identifies a corresponding word of the natural language text data.

According to another aspect, a method for natural language parsing includes loading, by a computing device, natural language text data, wherein the natural language text data comprises a plurality of words; applying, by the computing device, a constituency parser to the natural language text data to generate a constituency parse tree; applying, by the computing device, a constituency rule to the constituency parse tree to identify a plurality of clauses in the natural language text data, wherein each of the clauses comprises a disjoint subset of the plurality of words of the natural language text data; and applying, by the computing device, a dependency parser to each of the plurality of clauses to generate a dependency parse of each of the plurality of clauses.

In some embodiments, the constituency parse tree may include a plurality of nodes, wherein each node corresponds to a hierarchical constituent of the natural language text data. In some embodiments, applying the constituency rule may include identifying a left-most daughter of a subordinate clause node of the constituency parse tree. In some embodiments, each dependency parse may include a graph that includes a plurality of nodes and one or more edges, wherein each of the nodes corresponds to a word of the corresponding clause, and wherein each of the edges corresponds to a dependency relationship within the clause.

In some embodiments, the natural language text data may include a naturally elicited response. In some embodiments, the natural language text data may include comment data submitted by a user to a website.

In some embodiments, applying the constituency parser may include applying a constituency parser that does not rely on noun chunking as an initial parsing step. In some embodiments, applying the constituency rule may include determining a plurality of clause boundaries, wherein each of the clause boundaries is associated with a corresponding clause of the plurality of clauses. In some embodiments, the plurality of clause boundaries may include a plurality of non-overlapping character offsets in the natural language text data, wherein each of the non-overlapping character offsets identifies a corresponding word of the natural language text data.

According to another aspect, one or more non-transitory, computer readable media including a plurality of instructions stored thereon that in response to being executed cause a computing device to load natural language text data, wherein the natural language text data comprises a plurality of words; apply a constituency parser to the natural language text data to generate a constituency parse tree; apply a constituency rule to the constituency parse tree to identify a plurality of clauses in the natural language text data, wherein each of the clauses comprises a disjoint subset of the plurality of words of the natural language text data; and apply a dependency parser to each of the plurality of clauses to generate a dependency parse of each of the plurality of clauses.

In some embodiments, the constituency parse tree may include a plurality of nodes, wherein each node corresponds to a hierarchical constituent of the natural language text data. In some embodiments, to apply the constituency rule may include to identify a left-most daughter of a subordinate clause node of the constituency parse tree. In some embodiments, each dependency parse may include a graph that includes a plurality of nodes and one or more edges, wherein each of the nodes corresponds to a word of the corresponding clause, and wherein each of the edges corresponds to a dependency relationship within the clause.

In some embodiments, the natural language text data may include a naturally elicited response. In some embodiments, the natural language text data may include comment data submitted by a user to a website.

In some embodiments, to apply the constituency parser may include to apply a constituency parser that does not rely on noun chunking as an initial parsing step. In some embodiments, to apply the constituency rule may include to determine a plurality of clause boundaries, wherein each of the clause boundaries is associated with a corresponding clause of the plurality of clauses. In some embodiments, the plurality of clause boundaries may include a plurality of non-overlapping character offsets in the natural language text data, wherein each of the non-overlapping character offsets identifies a corresponding word of the natural language text data.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
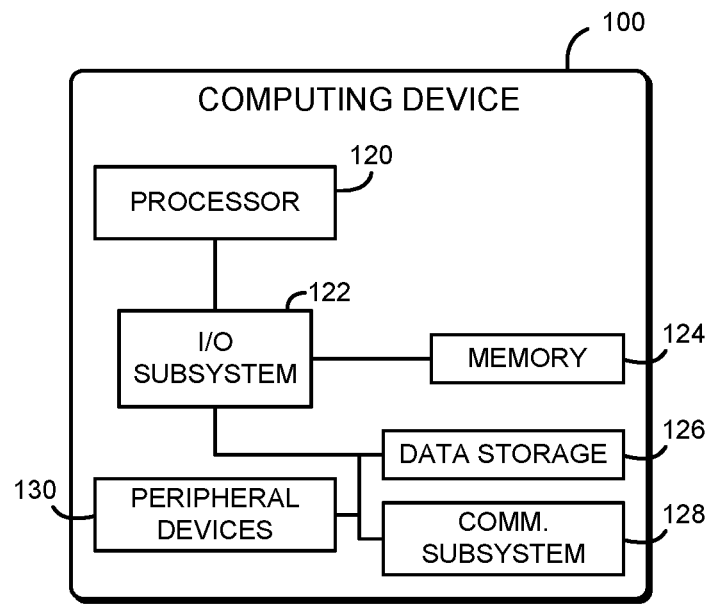
FIG. 1 is a simplified block diagram of at least one embodiment of a computing device for natural language parsing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C).

Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for natural language parsing is shown. In use, as described in more detail below, the computing device 100 processes natural language text with a constituency parser and identifies non-overlapping clauses of the natural language text. The computing device 100 next performs a dependency parse of each of the clauses. By performing this sequential natural language parsing, the computing device 100 avoids performing dependency parsing across clause boundaries. Thus, the computing device 100 produces valid dependency parses. In particular, when performing the parsing process as described herein, it is impossible for the computing device 100 to generate an incorrect dependency parse across a clause boundary, because the new clauses are given as separate input to the dependency parser. Accordingly, invalid parses generated by typical methods for dependency parsing may be remedied using the parsing process as described herein.

The computing device 100 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, an embedded system, a distributed computing system, a processor-based system, and/or a consumer electronic device. As shown in FIG. 1, the computing device 100 illustratively includes a processor 120, an input/output subsystem 122, a memory 124, a data storage device 126, and a communication subsystem 128. Of course, the computing device 100 may include other or additional components, such as those commonly found in a server (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processors 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 100 may be embodied as any communication circuit, device, or collection thereof, capable of enabling communications between the computing device 100 and other remote devices over a network. The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

Figure 2:
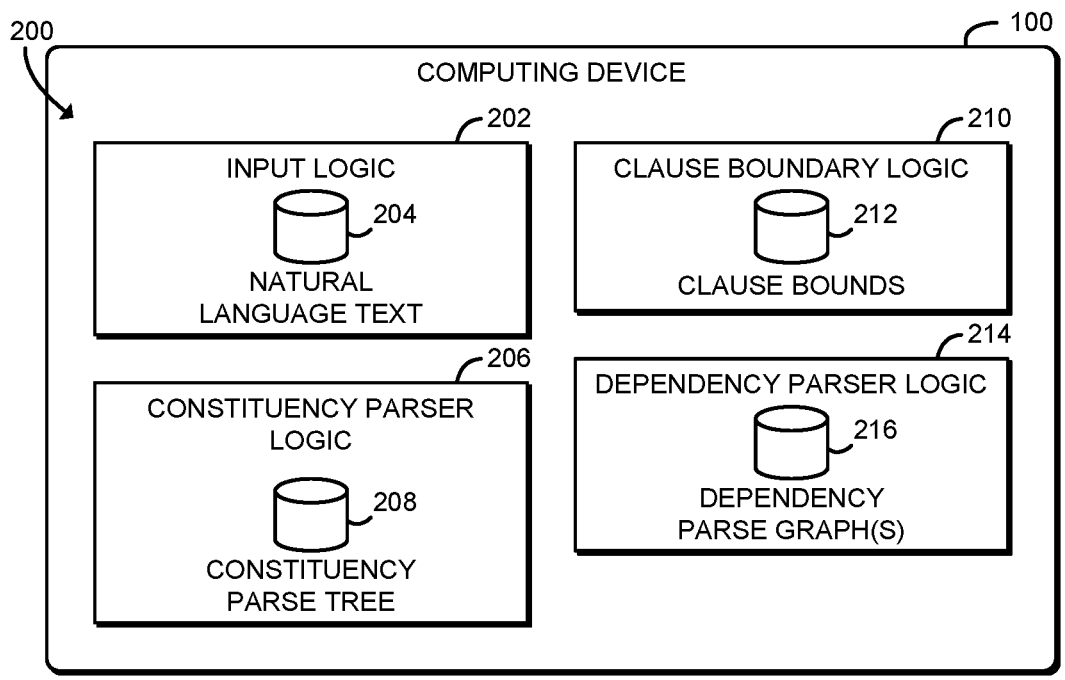
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes input logic 202, constituency parser logic 206, clause boundary logic 210, and dependency parser logic 214. The various components of the environment 200 may be embodied as hardware, firmware, software, or a combination thereof. As such, in some embodiments, one or more of the components of the environment 200 may be embodied as circuitry or collection of electrical devices (e.g., input logic circuitry 202, constituency parser logic circuitry 206, clause boundary logic circuitry 210, and/or dependency parser logic circuitry 214). It should be appreciated that, in such embodiments, one or more of the input logic circuitry 202, the constituency parser logic circuitry 206, the clause boundary logic circuitry 210, and/or the dependency parser logic circuitry 214 may form a portion of one or more of the processor 120, the I/O subsystem 122, and/or other components of the computing device 100. Additionally, in some embodiments, one or more of the illustrative components may form a portion of another component and/or one or more of the illustrative components may be independent of one another.

The input logic 202 is configured to load natural language text data 204. The natural language text data 204 includes a sequence of words, punctuation, or other elements. The natural language text data 204 may be embodied as a naturally elicited response, comment data submitted by a user to a website, or other natural language text.

The constituency parser logic 206 is configured to apply a constituency parser to the natural language text data 204 to generate a constituency parse tree 208. The constituency parse tree 208 includes multiple nodes connected by edges. Each node corresponds to a hierarchical constituent of the natural language text data 204. The constituency parser may not rely on noun chunking as an initial parsing step.

The clause boundary logic 210 is configured to apply a constituency rule to the constituency parse tree 208 to identify one or more clauses in the natural language text data 204. Each of the clauses includes a disjoint subset of the words of the natural language text data 204. Applying the constituency rule may include identifying a left-most daughter of a subordinate clause node of the constituency parse tree 208. Identifying the clauses may include determining one or more clause bounds 212 that are each associated with a corresponding clause. The clause bounds 212 may be embodied as non-overlapping character offsets in the natural language text data 204. Each of the non-overlapping character offsets identifies a corresponding word of the natural language text data 204.

The dependency parser logic 214 is configured to apply a dependency parser to each of the plurality of clauses to generate a dependency parse 216 of each of the plurality of clauses. Each dependency parse 216 may be embodied as a graph that includes multiple nodes and edges. Each of the nodes corresponds to a word of the corresponding clause, and each of the edges corresponds to a dependency relationship between the associated words within the clause.

Figure 3:
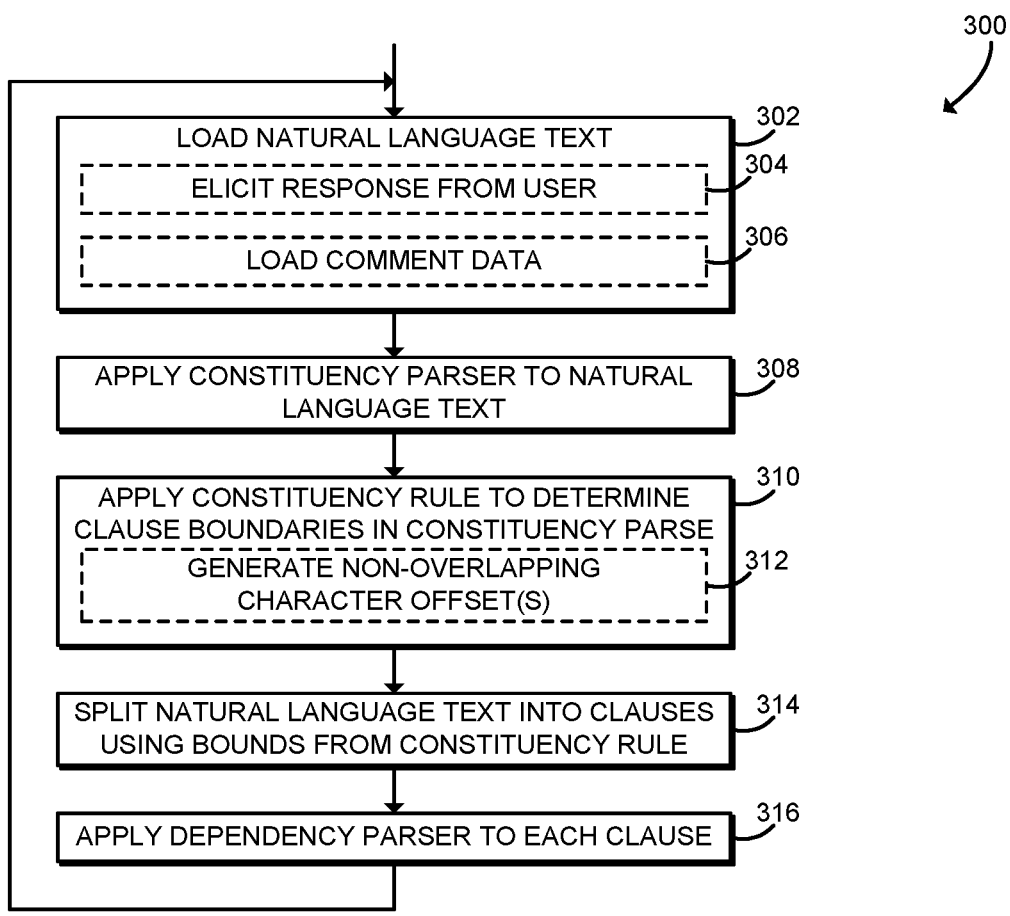
FIG. 3 is a simplified flow diagram of at least one embodiment of a method for natural language parsing that may be executed by the computing device of FIGS. 1-2.

Referring now to FIG. 3, in use, the computing device 100 may execute a method 300 for determining clause boundaries. It should be appreciated that, in some embodiments, the operations of the method 300 may be performed by one or more components of the environment 200 of the computing device 100 as shown in FIG. 2. The method 300 begins in block 302, in which the computing device 100 loads natural language text 204. The natural language text 204 may be embodied as a string of characters or other representation of natural language text. As described above, the natural language text 204 includes a sequence of words, symbols, syntactic units, or other elements. The computing device 100 may tokenize or otherwise process the natural language text 204 to identify the words or other syntactic units. The computing device 100 may load the natural language text 204 from a data storage device, an input device, a remote computing device, or otherwise load the natural language text 204 for processing.

In some embodiments, in block 304, the computing device 100 may elicit a response from a user of the computing device 100. For example, a virtual personal assistant or other natural language interface of the computing device 100 may prompt the user for the natural language text 204. Continuing that example, the natural language text 204 may be input textually by the user, the computing device 100 may perform speech-to-text conversion, or the natural language text 204 may be otherwise loaded by the computing device 100. In some embodiments, in block 306 the computing device 100 may load comment data submitted by a user to a website as the natural language text 204. The comment data may be submitted by the user to the computing device 100 or to another computing device. For example, the comment data may be submitted to the computing device 100 using a form field or other input element. As another example, the comment data may be retrieved by the computing device 100 from a database, a publicly available website, or another remote computing device.

In block 308, the computing device 100 applies a constituency parser to the natural language text 204. The constituency parser does not rely on noun chunking as its initial parsing step. Applying the constituency parser generates a constituency parse tree 208. The constituency parse tree 208 may include multiple leaf nodes or other terminal nodes corresponding to the words of the natural language text 204. Each leaf node is connected by an edge to a non-terminal node, up to a root node of the constituency parse tree 208. Each node of the constituency parse tree 208 corresponds to a hierarchical constituent of the natural language text 204.

In block 310, the computing device 100 applies a constituency rule that determines one or more clause bounds 212 in the constituency parse tree 208. Each of the clause bounds 212 identifies a non-overlapping clause within the natural language text 204 (e.g., a disjoint subset of the words within the natural language text 204). In certain circumstances the natural language text 204 may include a single clause; however, casual text (e.g., comment data or natural language responses) often contains multiple clauses. The constituency rule may be embodied as any rule that identifies non-overlapping clauses in the natural language text 204 based on the constituency parse tree 208. Illustratively, the constituency rule may identify the leftmost daughter node of each subordinate clause node of the constituency parse tree 208. In some embodiments, block 312, the computing device 100 generates non-overlapping character offsets as the clause bounds 212. Each character offset identifies a corresponding word of the natural language text 204.

In block 314, the computing device 100 splits the natural language text 204 into one or more clauses using the clause bounds 212 determined with the constituency rule. For example, in embodiments in which the clause bounds 212 are embodied as character offsets, the computing device 100 may group words into non-overlapping clauses that each start with a word identified by a corresponding offset.

In block 316, the computing device 100 applies the dependency parser to each of the newly identified clauses. Applying the dependency parser to each clause generates a dependency parse 216 associated with each of the clauses. As described above, each dependency parse 216 may be embodied as a graph that includes a node that represents each word of the corresponding phrase. The nodes may be connected by edges correspond to dependency relationships between the corresponding words within the clause. The computing device 100 may use the generated dependency parse graphs 216 for additional semantic processing or other processing of the natural language text data 204. After applying the dependency parser, the method 300 loops back to block 302, in which the computing device 100 may process additional natural language text data 204.

Figure 4:
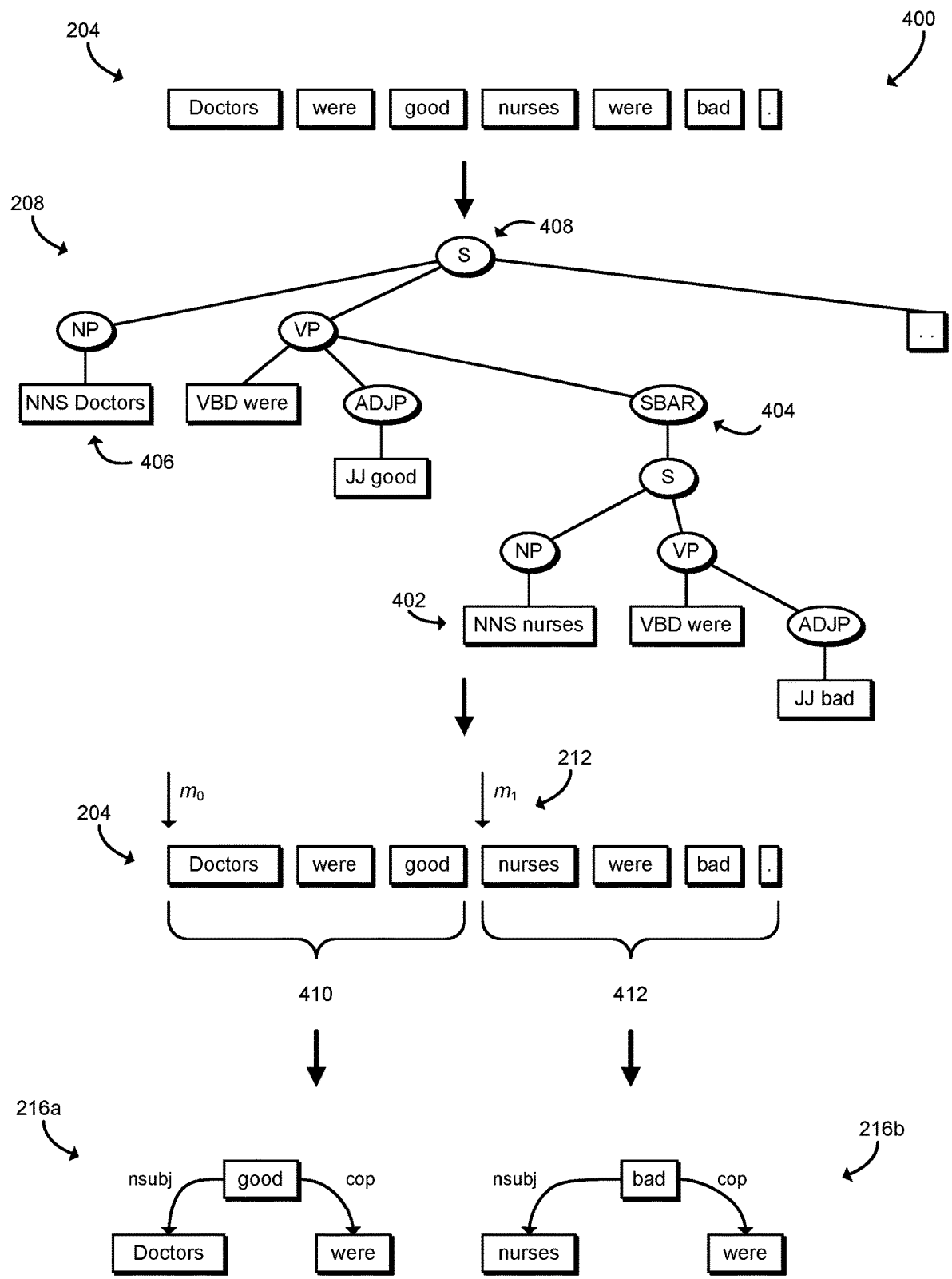
FIG. 4 is a schematic diagram illustrating at least one embodiment of natural language parsing of a sample natural language text according to the method of FIG. 3.

Referring now to FIG. 4, diagram 400 illustrates natural language processing of a sample natural language text 204. As shown in FIG. 4, the sample natural language text 204 is, "Doctors were good nurses were bad." For example, the sample natural language text 204 may be embodied as user comment data extracted from a website. The sample natural language text 204 is illustrated as a sequence of words (including a "word" corresponding to the "period" punctuation mark).

As shown, after loading the sample natural language text 204, the computing device 100 may run the constituency parser on the sample natural language text 204 to produce the constituent parse tree 208. The illustrative constituent parse tree 208 shown in FIG. 4 may also be described textually with the string,

```
((S
    (NP (NNS Doctors))
    (VP (VBD were)
        (ADJP (JJ good)
        (SBAR
            (S
                (NP (NNS nurses))
                (VP (VBD were)
                    (ADJP (JJ bad)))))))
    (. .)))
```

The nodes of the constituency parse tree 208 are illustratively labeled using constituency tags defined by the Penn Treebank Project. Illustratively, an S node is a simple declarative clause, an NP node is a noun phrase, an NNS node is a plural noun, a VP node is a verb phrase, a VBD node is a past tense verb, an ADJP node is an adjective phrase, a JJ node is an adjective, an SBAR node is a clause introduced by a subordinating conjunction (e.g., a subordinate clause), and a "." node is an end-of-sentence period. Although illustrated using the Penn Treebank constituency tags, the constituency parse tree 208 may be represented using any other tags, labels, or other identification system. Additionally, it should be understood that the constituency parse tree 208 of FIG. 4 is merely illustrative, and different constituency parse trees 208 may be generated in other embodiments.

After running the constituency parser, the computing device 100 may run the constituency rule on the constituency parse tree 208 to generate the clause bounds 212. The part of the rule relevant to the illustrative example may be:
    SBAR→leftmost daughter
This illustrative rule produces a character offset for the leftmost daughter of any SBAR node in the constituency parse tree 208. As shown, the clause bounds 212 include character offsets $m_0$, $m_1$. Illustratively, the character offset $m_1$ is the offset for the left-most child node 402 of the SBAR node 404, which is the word "nurses" in the natural language text 204. The clause bounds 212 also include the character offset $m_0$, which is the offset for the first word "Doctors" in the natural language text 204. The offset $m_0$ may be identified as the offset of the first word of the sample natural language text 204, as the leftmost daughter node 406 of the root S node 408, or using any other appropriate constituency rule.

As shown, the computing device 100 then splits the sample natural language text 204 into non-overlapping clauses 410, 412 using the character offsets $m_0$, $m_1$ produced by the constituency rule. Illustratively, the clause 410 includes the words "Doctors were good" and the clause 412 includes the words "nurses were bad."

Next, the computing device 100 runs the dependency parser on the separate clauses 410, 412 and generates the dependency parse graphs 216a, 216b, respectively. As shown, the dependency parse graph 216a includes an nsubj (nominal subject) dependency from "good" to "Doctors," and a cop (copula or linking verb) dependency from "good"

to "were." Similarly, the dependency parse graph 216b includes an nsubj (nominal subject) dependency from "bad" to "nurses," and a cop (copula or linking verb) dependency from "bad" to "were." Of course, in other embodiments the dependency parser may generate additional dependencies (e.g., root dependencies related to "good" or "bad") and/or different dependencies. Because the dependency parser of the computing device 100 processes each of the clauses 410, 412 separately, it is impossible to produce an invalid parse across the clause boundaries because they have been effectively separated by an "air gap."

Typical methods for dependency parsing may produce invalid dependency parses across clause boundaries for the sample natural language text 204. Typical dependency parsers may start with a "noun chunking" step, which may produce the following noun chunks for the sample natural language text 204: "(Doctors) were (good nurses) were bad." Those illustrative noun chunks posit invalid semantic dependencies between independent words and phrases and are thus are invalid. Therefore, a typical dependency parse may result in invalid dependencies, such as an adjectival modifier dependency from "nurses" to "good." As described above, the computing device 100 of this disclosure avoids such invalid dependency parses.

It should be appreciated that, in some embodiments, the method 300 may be embodied as various instructions stored on a computer-readable media, which may be executed by the processor 120 and/or other components of the computing device 100 to cause the computing device 100 to perform the method 300. The computer-readable media may be embodied as any type of media capable of being read by the computing device 100 including, but not limited to, the memory 124, the data storage device 126, firmware devices, other memory or data storage devices of the computing device 100, portable media readable by a peripheral device 130 of the computing device 100, and/or other media.

The invention claimed is:

1. A computing device for natural language parsing, the computing device comprising:
    input logic to load natural language text data, wherein the natural language text data comprises a plurality of words;
    constituency parser logic to apply a constituency parser to the natural language text data to generate a constituency parse tree;
    clause boundary logic to apply a constituency rule to the constituency parse tree to identify a plurality of clauses in the natural language text data by determining one or more clause bounds, wherein each of the plurality of clauses comprises a disjoint subset of the plurality of words of the natural language text data; and
    dependency parser logic to apply a dependency parser to each of the plurality of clauses to generate a dependency parse of each of the plurality of clauses.

2. The computing device of claim 1, wherein the constituency parse tree comprises a plurality of nodes, wherein each of the plurality of nodes corresponds to a hierarchical constituent of the natural language text data.

3. The computing device of claim 2, wherein to apply the constituency rule comprises to identify a left-most daughter of a subordinate clause node of the constituency parse tree.

4. The computing device of claim 1, wherein each dependency parse comprises a graph that includes a plurality of nodes and one or more edges, wherein each of the plurality of nodes corresponds to a word of a corresponding clause, and wherein each of the one or more edges corresponds to a dependency relationship within the corresponding clause.

5. The computing device of claim 1, wherein the natural language text data comprises a naturally elicited response.

6. The computing device of claim 1, wherein the natural language text data comprises comment data submitted by a user to a website.

7. The computing device of claim 1, wherein to apply the constituency parser comprises to apply a constituency parser that does not rely on noun chunking as an initial parsing step.

8. The computing device of claim 1, wherein to apply the constituency rule comprises to determine a plurality of clause boundaries, wherein each of the plurality of clause boundaries is associated with a corresponding clause of the plurality of clauses.

9. The computing device of claim 8, wherein the plurality of clause boundaries comprises a plurality of non-overlapping character offsets in the natural language text data, wherein each of the plurality of non-overlapping character offsets identifies a corresponding word of the natural language text data.

10. One or more non-transitory, computer readable media comprising a plurality of instructions stored thereon that in response to being executed cause a computing device to:
    load natural language text data, wherein the natural language text data comprises a plurality of words;
    apply a constituency parser to the natural language text data to generate a constituency parse tree;
    apply a constituency rule to the constituency parse tree to identify a plurality of clauses in the natural language text data by determining one or more clause bounds, wherein each of the plurality of clauses comprises a disjoint subset of the plurality of words of the natural language text data; and
    apply a dependency parser to each of the plurality of clauses to generate a dependency parse of each of the plurality of clauses.

11. The one or more non-transitory, computer readable media of claim 10, wherein the constituency parse tree comprises a plurality of nodes, wherein each of the plurality of nodes corresponds to a hierarchical constituent of the natural language text data.

12. The one or more non-transitory, computer readable media of claim 11, wherein to apply the constituency rule comprises to identify a left-most daughter of a subordinate clause node of the constituency parse tree.

13. The one or more non-transitory, computer readable media of claim 10, wherein each dependency parse comprises a graph that includes a plurality of nodes and one or more edges, wherein each of the plurality of nodes corresponds to a word of a corresponding clause and wherein each of the one or more edges corresponds to a dependency relationship within the corresponding clause.

14. The one or more non-transitory, computer readable media of claim 10, wherein to apply the constituency rule comprises to determine a plurality of clause boundaries, wherein each of the plurality of clause boundaries is associated with a corresponding clause of the plurality of clauses.

15. The one or more non-transitory, computer readable media of claim 14, wherein the plurality of clause boundaries comprises a plurality of non-overlapping character offsets in the natural language text data, wherein each of the plurality of non-overlapping character offsets identifies a corresponding word of the natural language text data.

16. A method for natural language parsing, the method comprising:

loading, by a computing device, natural language text data, wherein the natural language text data comprises a plurality of words;

applying, by the computing device, a constituency parser to the natural language text data to generate a constituency parse tree;

applying, by the computing device, a constituency rule to the constituency parse tree to identify a plurality of clauses in the natural language text data by determining one or more clause bounds, wherein each of the plurality of clauses comprises a disjoint subset of the plurality of words of the natural language text data; and applying, by the computing device, a dependency parser to each of the plurality of clauses to generate a dependency parse of each of the plurality of clauses.

17. The method of claim 16, wherein the constituency parse tree comprises a plurality of nodes, wherein each of the plurality of nodes corresponds to a hierarchical constituent of the natural language text data.

18. The method of claim 17, wherein applying the constituency rule comprises identifying a left-most daughter of a subordinate clause node of the constituency parse tree.

19. The method of claim 16, wherein each dependency parse comprises a graph that includes a plurality of nodes and one or more edges, wherein each of the plurality of nodes corresponds to a word of a corresponding clause, and wherein each of the one or more edges corresponds to a dependency relationship within the corresponding clause.

20. The method of claim 16, wherein applying the constituency rule comprises determining a plurality of clause boundaries, wherein each of the plurality of clause boundaries is associated with a corresponding clause of the plurality of clauses.

* * * * *